United States Patent
Erickson (10) Patent No.: US 8,800,318 B2
(45) Date of Patent: Aug. 12, 2014

(54) HYBRID SPRAY ABSORBER

(76) Inventor: Donald Charles Erickson, Annapolis, MD (US)

( * ) Notice: Subject to any disclaimer, the term of this patent is extended or adjusted under 35 U.S.C. 154(b) by 1164 days.

(21) Appl. No.: 12/655,868

(22) Filed: Jan. 8, 2010

(65) Prior Publication Data
US 2010/0175395 A1 Jul. 15, 2010

Related U.S. Application Data

(60) Provisional application No. 61/204,749, filed on Jan. 9, 2009.

(51) Int. Cl.
F25B 17/06 (2006.01)

(52) U.S. Cl.
USPC .............................. 62/479; 62/484

(58) Field of Classification Search
USPC ........... 62/479, 484, 475, 476, 483, 497, 494, 62/101
See application file for complete search history.

(56) References Cited

U.S. PATENT DOCUMENTS

| | | | |
|---|---|---|---|
| 3,580,001 A | | 5/1971 | Eisberg |
| 5,007,240 A | * | 4/1991 | Ishida et al. ................ 60/673 |
| 5,363,668 A | * | 11/1994 | Nakao et al. ................ 62/141 |
| 5,572,885 A | * | 11/1996 | Erickson ..................... 62/484 |
| 5,592,825 A | * | 1/1997 | Inoue .......................... 62/141 |
| 6,523,357 B1 | * | 2/2003 | Katayama ................... 62/141 |
| 6,679,083 B1 | | 1/2004 | Erickson |

OTHER PUBLICATIONS

Warnakulasuriya, F. and Worek, W.M.; International Journal Heat Mass Transfer, vol. 51; 2008.
Summerer, F., et al; "Hydroxide Absorption Heat Pumps with Spray Absorber"; ASHRAE Paper AT-96-17-5; 1996; Transactions vol. 102, Part 1.
Ryan, W.A.; "Water Absorption in an Adiabatic Spray of Aqueous Lithium Bromide Solution"; AES vol. 31, ASME; 1993.
Venegas, M., et al; "Spray Absorbers in Absorption Systems Using Nitrate-Ammonia Solution"; International Journal of Refrigeration; 2005; vol. 28.
Gutierrez, G., et al; "Performance Analysis of an Adiabatic Absorption Test Rig Fed with a Low Temperature Heat Source", Tarragona.

* cited by examiner

Primary Examiner — Mohammad M Ali (57) ABSTRACT

A hybrid absorber is disclosed for a closed absorption cycle apparatus. The hybrid absorber is comprised of a non-adiabatic section plus an adiabatic spray section in that order, with absorbent solution and vapor supplied sequentially to them. The spray section preferably also includes a non-adiabatic spray cooler. Coolant is supplied to the non-adiabatic absorber and the cooler either in parallel or in series, countercurrently to the absorbent.

20 Claims, 7 Drawing Sheets

Air-cooled
hybrid spray absorber,
solution pump boosted
by spray pump

FIGURE 7

HYBRID SPRAY ABSORBER

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

Closed absorption cycles use heat to produce at least one of refrigeration, heat pumping, and power. Especially with the ammonia-water type absorption cycle, but also generally with all types, the absorption step is recognized as being the most difficult of the four major heat and mass transfer steps of the cycle (absorption, desorption, condensation, and evaporation). With ammonia-water absorption, the water vapor absorbs preferentially into the absorbent solution relative to the ammonia vapor, leaving higher purity ammonia vapor at the liquid interface. This reduces the concentration driving force, thus impeding mass transfer of vapor into liquid. It is hypothesized that the cause of this is that the flux of vapor into the liquid has a much higher $NH_3$ concentration than the liquid does, thus establishing a concentration gradient in the liquid, that feeds back to a concentration gradient in the vapor.

Ammonia-water absorption has conventionally been accomplished industrially by spraying absorbent solution over a tube bundle (or into the tubes) in the presence of the vapor to be absorbed, with cooling water on the other side of the tubes. An example of each is found in Bogart 1981 and in Malewski 1986. In residential-scale air-cooled units, the solution and vapor are apportioned into multiple parallel fin-tubes, with air blown across the fins. Pairs of tubes are joined after about two thirds of the absorption is accomplished, to keep the tube-side velocity in a desirable range for vapor-liquid mixing. See for example U.S. Pat. No. 3,580,001.

More recently, shell and coil absorbers have been used to improve the ammonia-water absorption rates. For example, U.S. Pat. No. 6,679,083 discloses cocurrent upflow of ammonia-water liquid and vapor on the shell side of this geometry, with countercurrent downflow of coolant on the tube side. With all three of the above approaches to absorption, the problem persists that as vapor absorption proceeds, the vapor volume decreases, the fluid velocities become lower and more quiescent, and hence absorption slows markedly. As a result large temperature driving forces become necessary, some of the cooling is wasted on subcooling the absorbent liquid, and large, costly absorbers are required.

With LiBr absorption (and other water vapor absorbents such as hydroxide mixtures), the vapor phase is single component (pure water vapor), since the absorbent is non-volatile. However absorption is still the limiting step, for a different reason=the very low pressure (deep vacuum). Trace amounts of inert gas will blanket the tubes at one hundredth of an atmosphere. LiBr absorption is frequently accomplished by spraying absorbent solution on cooled tube bundles, similar to some ammonia-water applications. This is referred to as falling film absorption. There has been some investigation reported on an alternative technique for LiBr absorption—adiabatic spray. Instead of spraying the solution onto a tube bundle, it is sprayed into a vacuum chamber, so the vapor is absorbed adiabatically. All of the heat of absorption goes into sensible heating of the solution, so it becomes quite warm. In order to limit the temperature rise to practical values, a very large volume spray is used, and the spray liquid is continuously recirculated by pumping through a liquid cooler and back to the spray nozzles. The advantage of this technique is that the heat transfer step enjoys very large transfer coefficients characteristic of liquid-liquid heat transfer. The disadvantage is that the recirculating liquid flowrate must be five to ten times larger than the flowrate of solution between absorber and desorber. This technique is described in Warnakulasuriya, F. and Worek, W. M., 2008 (Int J. Heat Mass Transf) vol 51; and in Summerer, F., et al, "Hydroxide Absorption Heat Pumps with Spray Absorber", ASHRAE Paper AT-96-17-5, Transactions vol 102, Part 1, 1996. Also of interest are: Ryan, W. A., "Water Absorption in an Adiabatic Spray of Aqueous Lithium Bromide Solution", AES Vol 31, ASME 1993; and Venegas, M., et al, "Spray Absorbers in Absorption Systems Using Lithium Nitrate-Ammonia Solution", International Journal of Refrigeration, 2005, vol 28; and Gutierrez, G., et al, 2007, "Performance Analysis of an adiabatic absorption test rig fed with a low temperature heat source", Tarragona.

Thus included among the problems of the prior art absorbers is that the recirculated spray adiabatic absorbers require exceptionally large pumping rates of absorbent solution; that LiBr falling film absorbers have pressure drop limitations and inert gas accumulation limitations; and that ammonia=water absorbers have performance limitations associated with low vapor velocities at the end of the absorption step, and also with buildup of excess ammonia concentration at the vapor-liquid interface under quiescent (low velocity) conditions.

DISCLOSURE OF INVENTION

The above problems are solved and additional useful objects are achieved by providing as the absorber in a closed absorption cycle a hybrid, multi-component absorber, comprised of a non-adiabatic section followed by an adiabatic spray section, wherein the spray section further includes a liquid recirculation pump and a liquid cooler. Both the vapor and the absorbent liquid are supplied sequentially to the two absorption sections in that order. The cooling supplied to the non-adiabatic section and the cooler can be either in parallel or series, and preferably countercurrent to the absorbent liquid. Further advantage is gained in some applications when the spray pump is also used for other functions, especially priming the solution pump, and when the spray receiver is partitioned such that the HP solution pump is supplied cooler, more concentrated solution (weaker in absorbing power) than the spray pump.

BRIEF DESCRIPTION OF THE DRAWINGS

FIG. 1 illustrates a state-of-art absorption refrigeration cycle for a volatile absorbent (e.g. the ammonia-water working pair). The closed cycle is comprised of condenser, evaporator, non-adiabatic absorber, generator (also called desorber), rectifier (including SCR and GHX sections), plus also internal heat recuperators RHX and SHX. The novel feature of the hybrid absorber is the adiabatic spray receiver, fed by a bleed from the solution pump, plus throttle valve. In this simplest embodiment of the hybrid spray absorber the spray doesn't deliver any additional cooling, but merely functions to reduce the degree of subcooling of the absorbent solution.

BEST MODE FOR CARRYING OUT THE INVENTION

Figure 1:
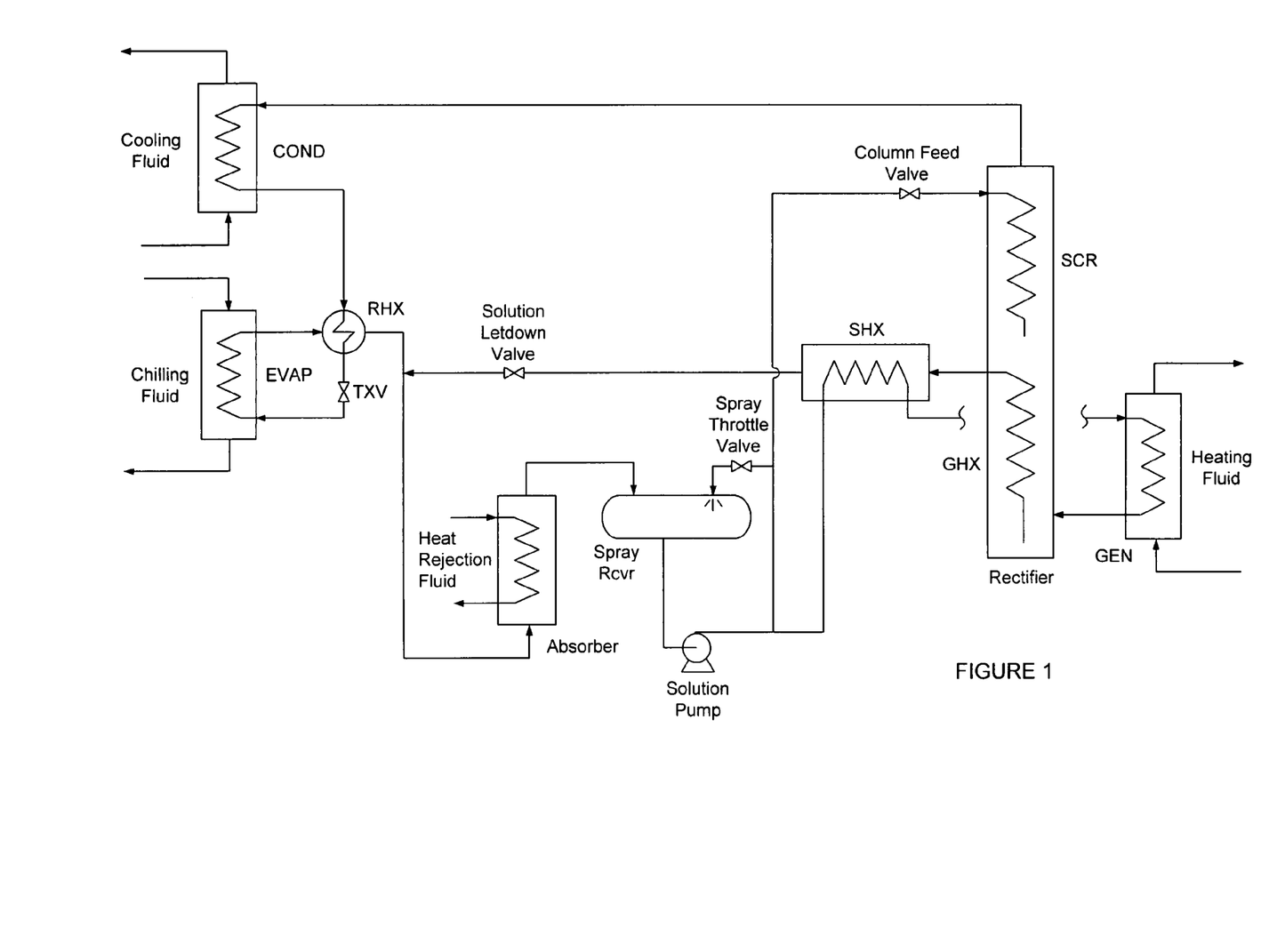
Figure 2:
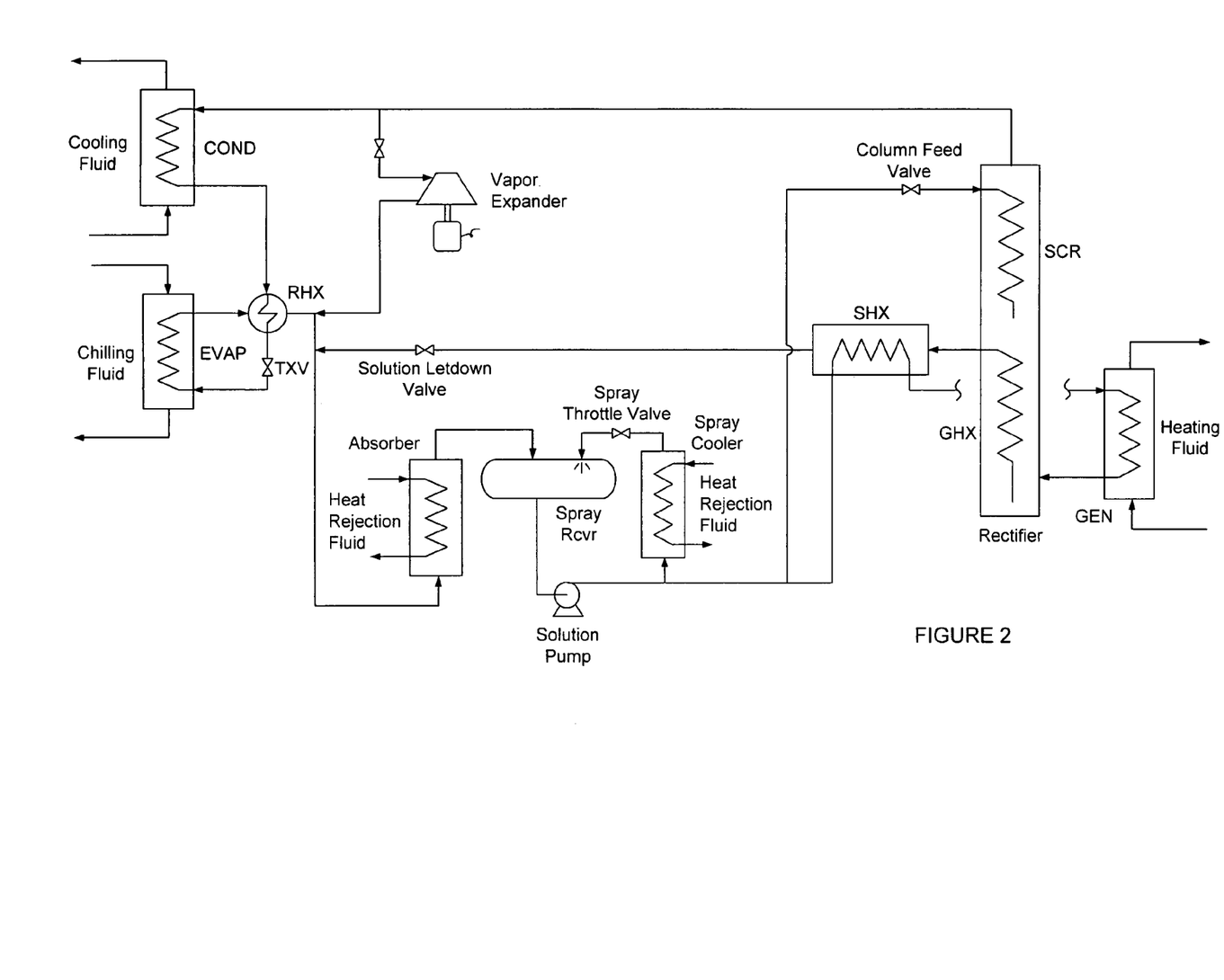
FIGS. 2 through 7 illustrate further advantageous embodiments of the hybrid spray absorber.

In FIG. 2 a spray cooler has been added to the FIG. 1 flowsheet. By lowering the temperature of the solution supplied to the spray nozzle(s), appreciably more vapor is absorbed into the spray, on the order of 10 to 30% of the total vapor absorption duty. This ensures that the fluid exiting from the non-adiabatic absorber will have appreciable velocity and turbulence, thus causing good absorption performance. Both the non-adiabatic absorber and the spray cooler absorber are cooled by a heat rejection fluid, which can be routed to them either in parallel or series. That fluid can be cooling water or air, or when useful heating is desired, it can be the media desired to be heated (hot water, feedwater, air, etc.). FIG. 2 also illustrates the optional presence of a vapor work expander, which can convert the waste heat to power whenever the refrigeration demand is satisfied and waste heat is still available. This option applies to all absorption refrigeration flowsheets.

Figure 3:
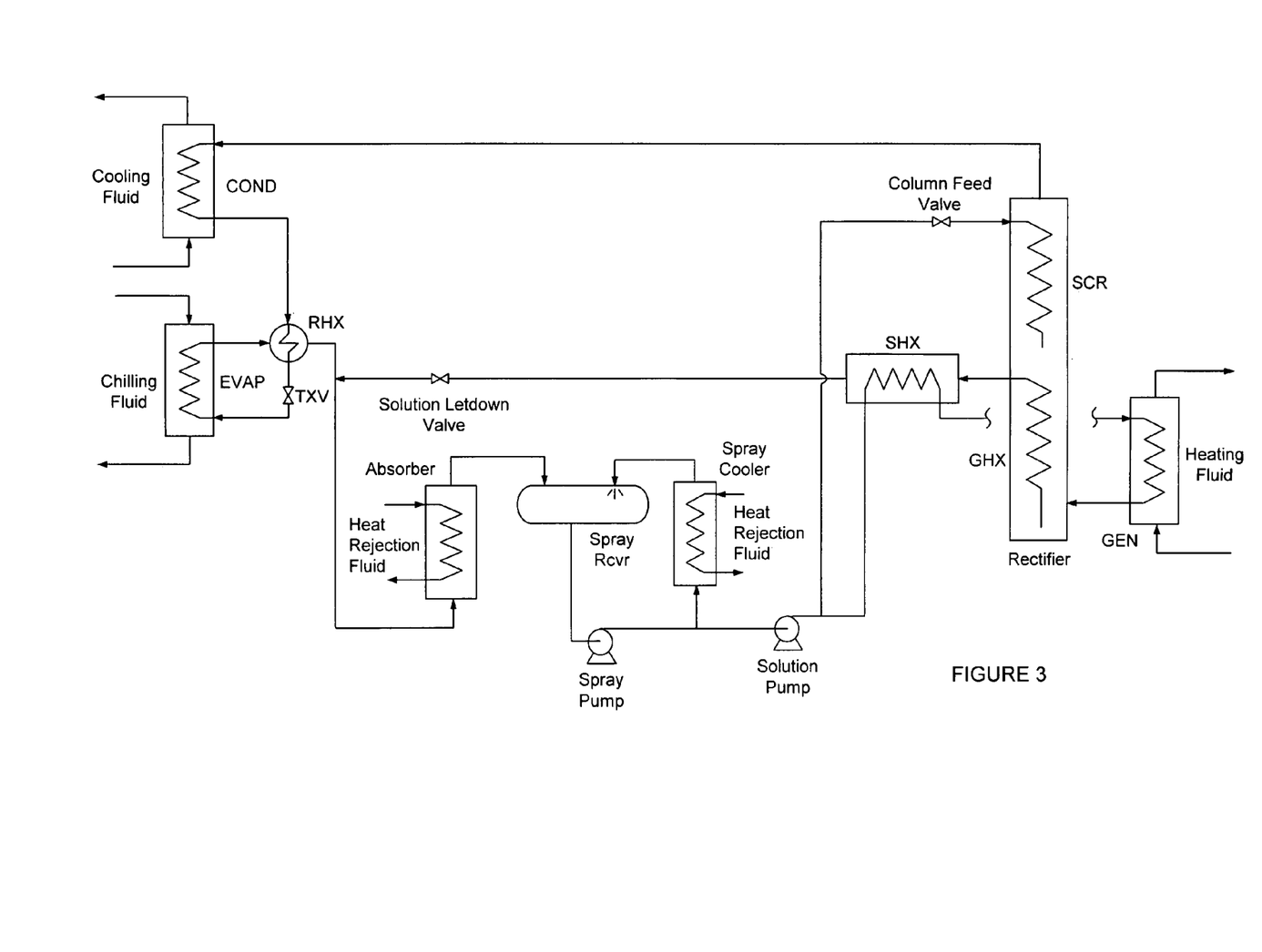

FIG. 3 further modifies the hybrid spray absorber of the FIG. 2 flowsheet to have a separate dedicated spray pump, which also acts as an inlet pressure booster to the solution pump, i.e. it primes the solution pump. Since the spray pump only develops the head necessary for the spray loop, the spray throttle valve is no longer necessary, and there is a large saving in pumping power.

Figure 4:
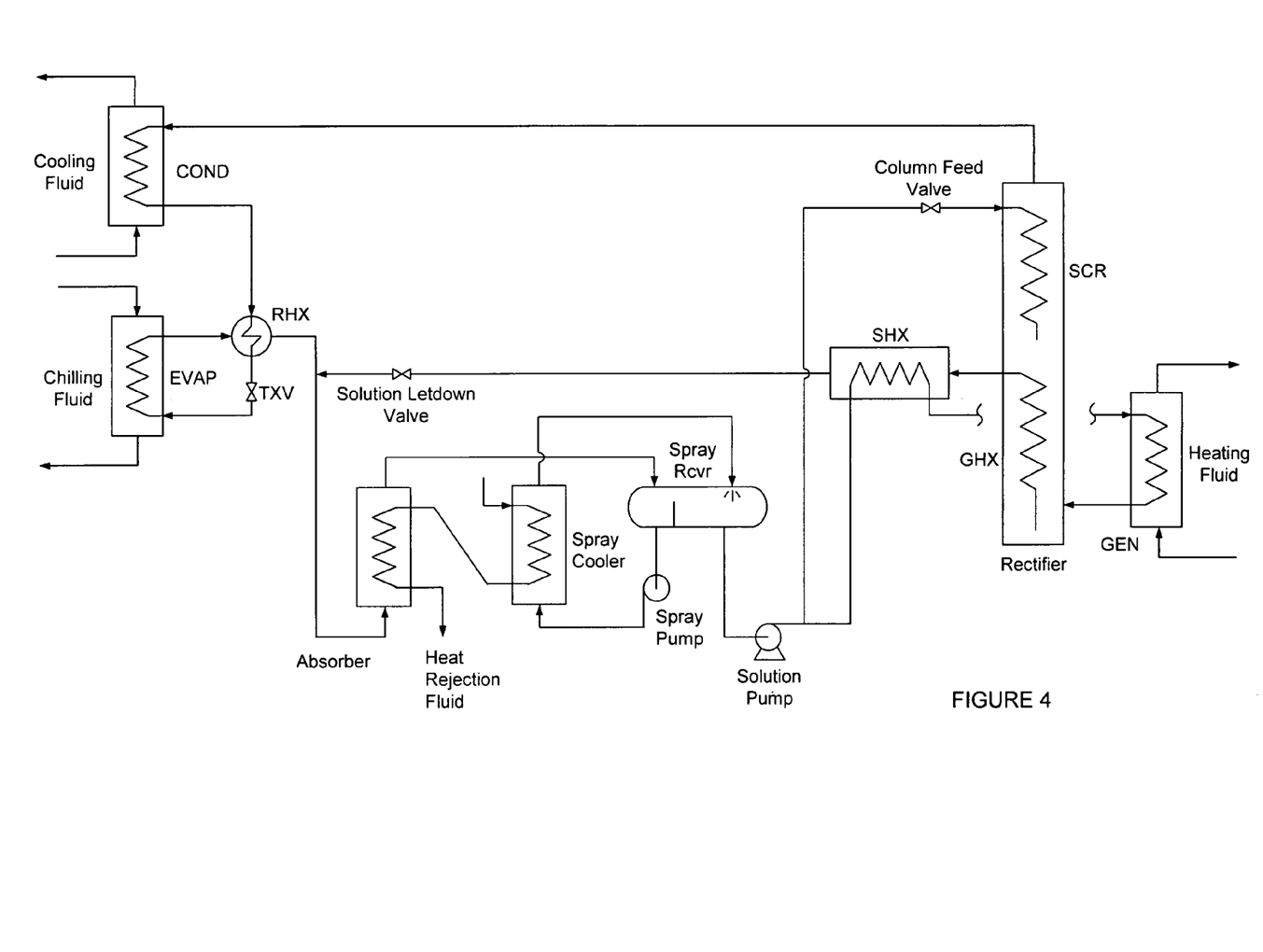

FIG. 4 illustrates a further improvement to the hybrid spray absorber wherein advantage is taken of solution concentration gradients that can be present in the solution spray receiver, provided separate spray and solution pumps are present. The spray pump takes suction on the receiver in the vicinity of the discharge from the non-adiabatic absorber, before the spray, whereas the solution pump takes suction in the vicinity of the spray nozzles, after the spray. The two solutions of slightly differing concentrations (around 1 to 5% difference in concentration) are kept mostly separated by an optional partition in the spray receiver. The spray pump flowrate is preferably maintained approximately equal to or somewhat higher than the solution pump flowrate, while vapor migrates freely throughout the receiver. Hence the spray pump flowrate is only one to two times the solution pump flowrate with this configuration of hybrid spray absorber, vs 10 to 20 times as much with the stand-alone adiabatic spray absorber.

Figure 5:
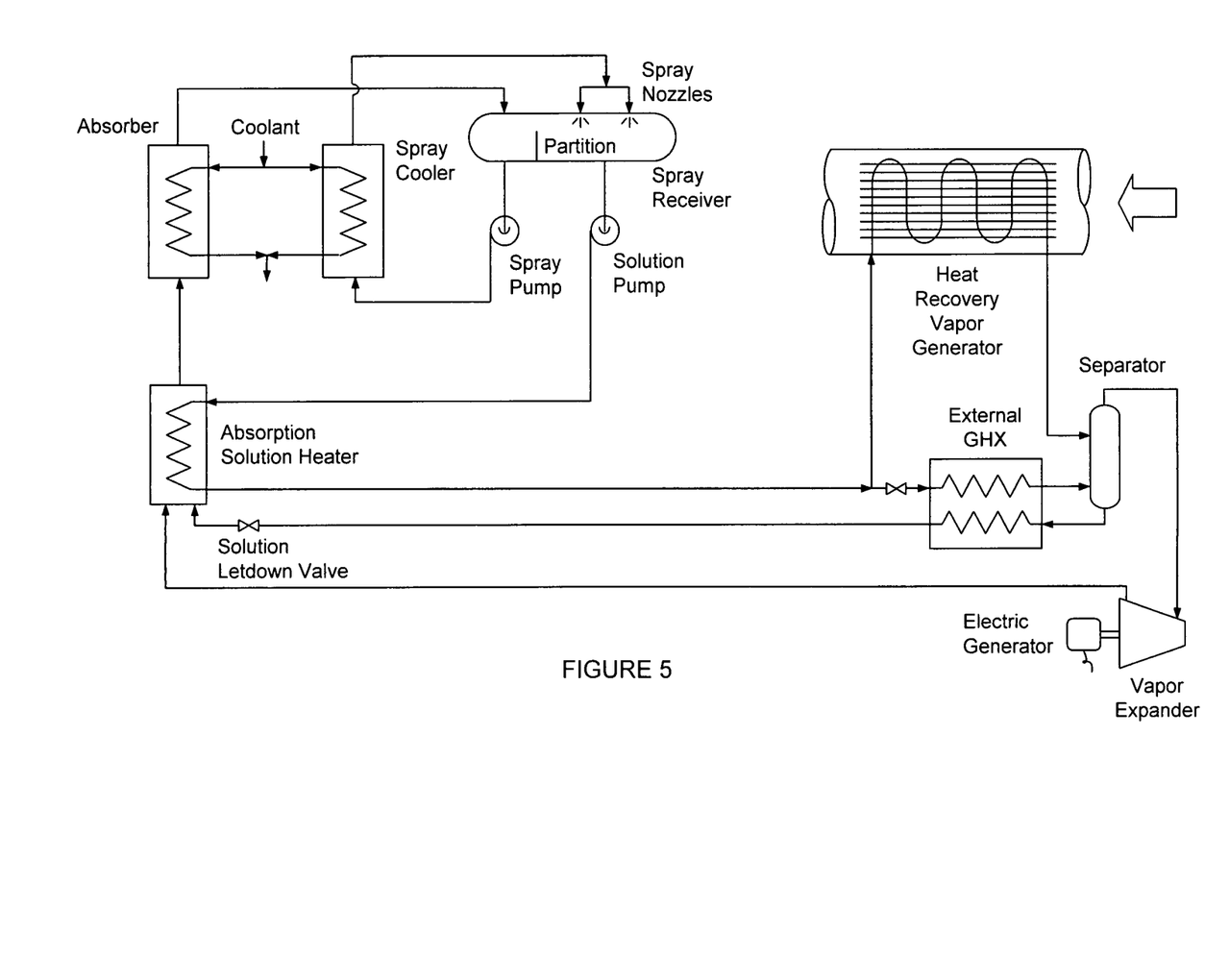

FIG. 5 illustrates the application of the FIG. 4 embodiment of the hybrid spray absorber to an absorption power cycle, as differentiated from an absorption refrigeration cycle. This flowsheet also illustrates two other components that are useful in both types of cycle in certain circumstances—the absorption heat exchanger (also known as "absorption solution heater"), and the "external GHX". This flowsheet shows the heat rejection coolant for the absorber and spray cooler being in parallel, vs in series for the FIG. 4 flowsheet. Series heat rejection is more useful when useful heating is desired, as opposed to parallel heat rejection.

Figure 6:
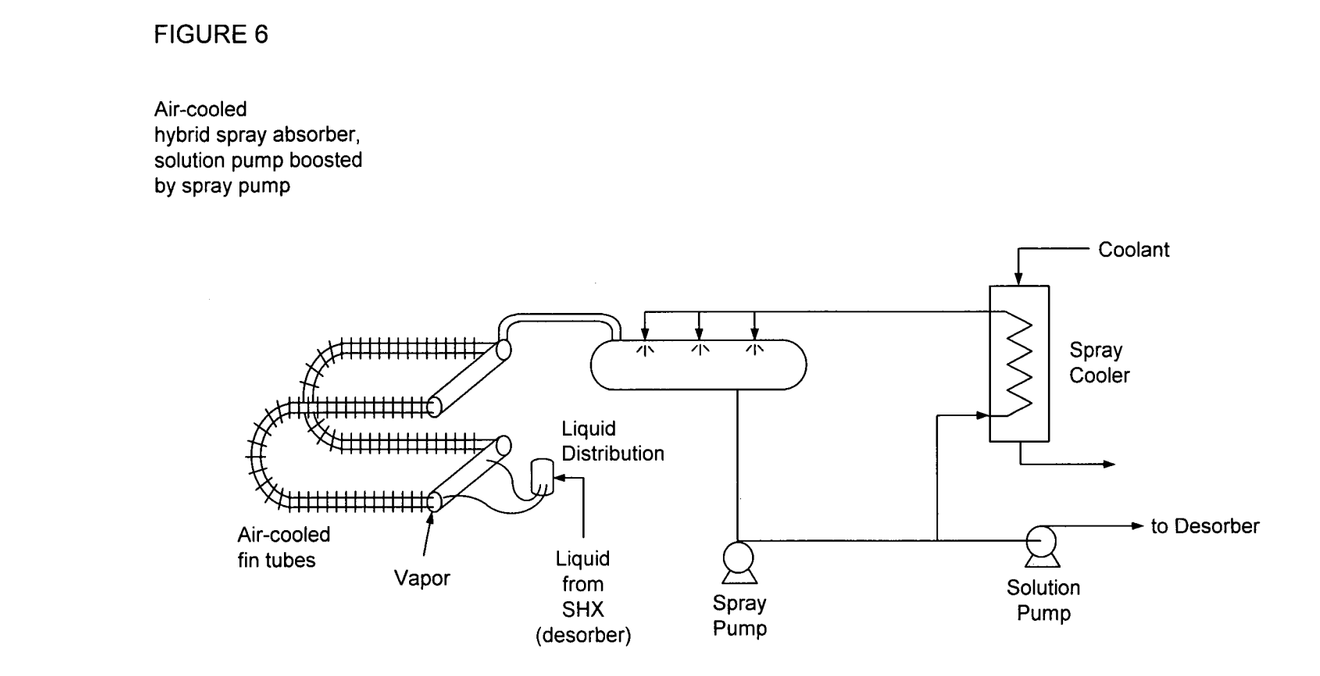

FIG. 6 illustrates the hybrid spray absorber section of an air-cooled absorption cycle. This configuration applies to any type of absorption cycle—refrigeration, power, heat pumping, or dual function. The key to effective in-tube absorption, as shown here, is both to use the hybrid spray absorber technique, and also to have positive introduction of absorbent solution into each and every tube.

Figure 7:
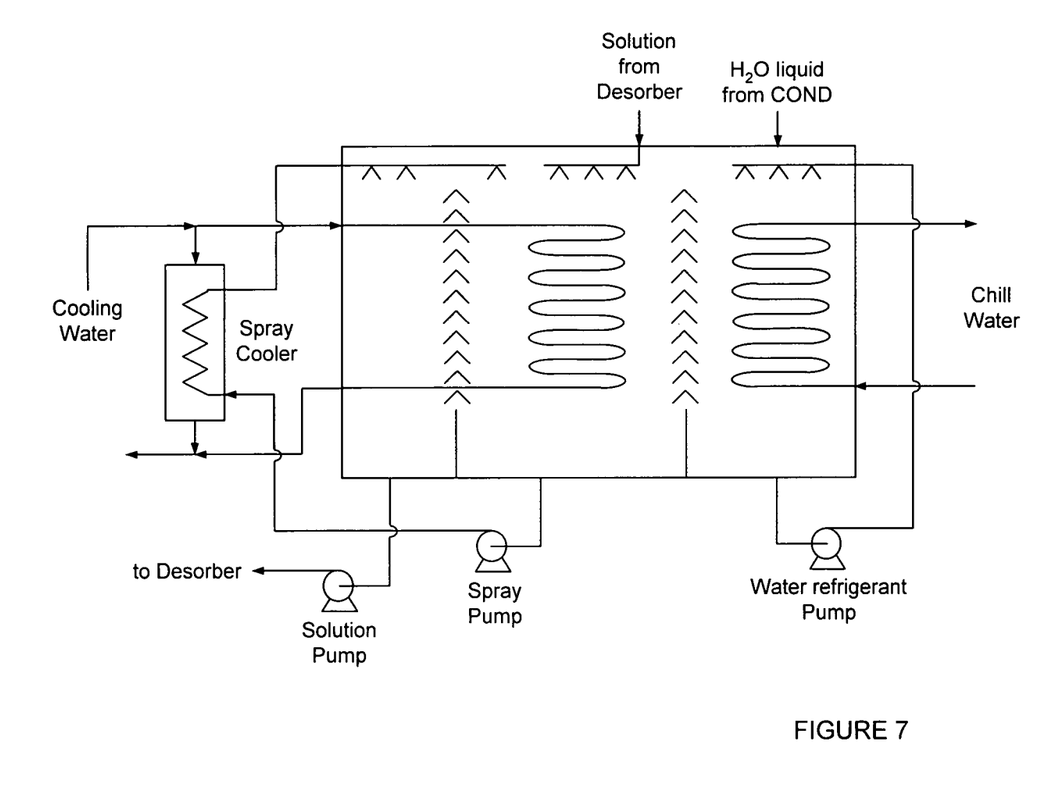

FIG. 7 illustrates that the hybrid spray absorber can be beneficially applied to all types of absorption cycles, including those using non-volatile absorbents, such as the LiBr—H2O absorption cycle. FIG. 7 shows the addition of a spray chamber, spray pump, and spray cooler to a conventional absorber/evaporator section of this type of unit.

The invention claimed is:

1. A hybrid absorber for a closed cycle absorption apparatus, comprised of:
   a. a non-adiabatic absorption section;
   b. an adiabatic spray absorption section that receives vapor and liquid from said non-adiabatic section; and
   c. a recirculating liquid spray loop for said adiabatic section, comprised of a spray pump that is piped directly to said adiabatic section, and a spray cooler that is piped directly to said spray pump.

2. The apparatus according to claim 1 wherein the absorbent liquid is aqueous ammonia, and the non-adiabatic absorber is a shell and coil configuration.

3. The apparatus according to claim 1 wherein the absorbent liquid is aqueous ammonia, and the non-adiabatic absorber is an air-cooled configuration comprised of fin tubes plus liquid injectors for injecting solution into each tube.

4. The apparatus according to claim 1 wherein the non-adiabatic absorber is a shell and tube configuration.

5. The apparatus according to claim 1 wherein the absorbent liquid is aqueous ammonia, and the non-adiabatic absorber is a wetted surface configuration comprised of tubes wetted on the outside by recirculated spray water plus liquid injectors for injecting solution into each tube.

6. The apparatus according to claim 1 additionally comprised of a solution pump that pumps absorbent liquid to the desorber of said absorption apparatus, and wherein said spray pump also boosts said solution pump.

7. The apparatus according to claim 1 wherein said spray pump also supplies cooling liquid to the rectifier of said absorption apparatus.

8. The apparatus according to claim 1 wherein said spray pump also supplies coolant to said non-adiabatic absorber and said cooler.

9. A hybrid absorber for a closed cycle absorption apparatus, comprised of:
   a. a non-adiabatic absorption section;
   b. an adiabatic spray absorption section that receives vapor and liquid from said non-adiabatic section;
   c. a recirculating liquid spray loop for said adiabatic section, comprised of a spray pump and a cooler; and
   d. a spray receiver for said solution that has separate suction pipes for the spray pump and the solution pump, plus a partition between the two suctions.

10. The apparatus according to claim 1 wherein said spray pump is also the solution pump that supplies absorbent liquid to the desorber.

11. The apparatus according to claim 1 wherein the absorbent is aqueous ammonia, and the absorber receives vapor from an ammonia expander that produces power.

12. The apparatus according to claim 1 wherein the absorbent is aqueous ammonia, and the absorber receives vapor from an ammonia evaporator that produces refrigeration.

13. The apparatus according to claim 1 wherein the absorbent is aqueous ammonia, and wherein useful heating is supplied by the heat rejected from said non-adiabatic absorber and said cooler.

14. A closed absorption cycle apparatus comprised of:
   a. an absorber comprised of a non-adiabatic section followed by an adiabatic spray section, the latter including a spray pump and a spray cooler, and wherein said adiabatic spray section receives both vapor and liquid from said non-adiabatic section;
   b. a desorber; and
   c. a solution pump that circulates absorbent from said absorber to said desorber.

15. The apparatus according to claim 14 additionally comprised of a spray receiver for said absorbent that receives vapor and liquid from said non-adiabatic absorber; supplies suction liquid to said spray pump; and supplies separate suction liquid from under the spray nozzles to said solution pump.

16. The apparatus according to claim 15 wherein said absorbent is aqueous LiBr, and additionally comprised of an evaporator and condenser.

17. The apparatus according to claim 15 wherein said absorbent is aqueous ammonia, and additionally comprised of an evaporator and condenser.

18. The apparatus according to claim 15 additionally comprised of an expander that is supplied high pressure vapor from said desorber and supplies low pressure vapor to said absorber, and wherein said absorbent is aqueous ammonia.

19. An absorption process for producing at least one of refrigeration, heat pumping, and power from a heat source, comprising:
   a. desorbing vapor from an absorbent liquid with said heat source;
   b. absorbing the vapor at lower pressure into the desorbed liquid in a multi-step process comprised of:
      i. partially absorbing the vapor in a non-adiabatic absorber;
      ii. routing the residual vapor and liquid to an adiabatic spray absorber;
      iii. absorbing the residual vapor in an adiabatic spray absorber; and
      iv. recirculating and cooling the spray liquid.

20. The process according to claim 19 additionally comprising using aqueous ammonia as the absorbent.

* * * * *